United States Patent [19]

Brouwer et al.

[11] 4,015,666
[45] Apr. 5, 1977

[54] SOD UNDERCUTTING KNIFE

[75] Inventors: Gerardus Johannes Brouwer, Keswick; Theodorus Petrus Hubertus Gerrits, Newmarket, both of Canada

[73] Assignee: Brouwer Turf Equipment Limited, Keswick, Canada

[22] Filed: Mar. 3, 1975

[21] Appl. No.: 554,811

[52] U.S. Cl. .............................. 172/19; 172/192; 172/698; 172/770

[51] Int. Cl.² ........................................ A01B 45/04

[58] Field of Search ............... 172/19, 20, 93, 101, 172/192, 698, 719, 720, 767, 770; 37/141 R, 141 T

[56] References Cited

UNITED STATES PATENTS

| | | | |
|---|---|---|---|
| 59,557 | 11/1866 | Coffey | 172/19 |
| 1,195,919 | 8/1916 | Delaney | 172/698 |
| 2,828,558 | 4/1958 | Reinhard | 37/141 T |
| 3,034,586 | 5/1962 | Ditter | 172/19 |
| 3,051,251 | 8/1962 | Golden | 172/20 |
| 3,235,011 | 2/1966 | Pasinski et al. | 172/19 |
| 3,509,944 | 5/1970 | Brouwer et al. | 172/19 |

Primary Examiner—Richard T. Stouffer
Attorney, Agent, or Firm—Rogers, Bereskin & Parr

[57] ABSTRACT

An undercutting knife for a sod cutting machine. The knife has an undercutting blade having a front portion and an upwardly bent rear portion. Connected to the rear portion are two support and guide members, one at each edge of the blade. Each support and guide member extends rearwardly from the blade and has a rear portion projecting laterally of the blade. Mounting arms are connected to the laterally extending portions. The mounting arms, which are connected to mechanism for supporting and reciprocating the knife, are clear of the ground and are spaced laterally of cut sod moving over the knife, so as not to tear the edges of the sod. A guide strip extends rearwardly from the blade between the support and guide members. The support and guide members and the guide strip can be three discrete members or a single integral unit.

6 Claims, 5 Drawing Figures

SOD UNDERCUTTING KNIFE

This invention relates to an undercutting knife for a sod cutting machine.

Sod cutting machines are commonly used to cut strips of grass sod from a field of turf. In such machines there is a substantially horizontal undercutting blade to cut beneath the strip to be removed, and a pair of side cutting blades to cut the edges of the strip. (In addition there is a cross cutting blade to cut the strips into lengths but the present invention is not concerned with this blade.) Conventionally the side cutting blades are attached to the edges of the undercutting blade to form a composite knife, as shown in Canadian Pat. No. 641,787 issued May 29, 1962 to Sod-Master Corporation. The knife shown in that patent may be used in a simple sod cutting machine, or it may be used in a machine of the kind shown in Brouwer U.S. Pat. No. 3,509,944 issued on May 5, 1970 (which machine both cuts and rolls up the sod).

The cutting knife in which the side cutting blades are connected to the undercutting blade has certain disadvantages. Firstly, it tends to wear out rapidly and is expensive to replace, since the undercutting and side cutting blades all form a single unit, and since it may also include guide strips (as shown in the said U.S. patent) to guide cut sod to a conveyor behind the knife. Secondly, as the cut sod travels over the undercutting blade, its edges rub against the side cutting blades, and this may tend to tear the cut sod strip.

Accordingly it is an object of this invention in one of its aspects to provide a sod cutting knife in which the undercutting blade is conveniently replaceable. In a preferred embodiment of the invention the undercutting blade is extended rearwardly and is supported and driven at a location such that interference by the supports with the passage of the undercutting blade through the ground is minimized, and so that the cut sod strip does not rub against the side supports of the knife.

To this end the invention provides a sod cutting knife comprising:

a. an undercutting blade having a front cutting edge, and a rear portion, b. combined support and guide means for said undercutting blade, said support and guide means having a front portion and a rear portion, and means detachably connecting said front portion of said support and guide means to said rear portion of said blade for smooth passage of sod from said blade over said support and guide means, c. said rear portion of said support and guide means having two laterally extending portions, one at each side thereof, each laterally extending portion extending laterally beyond a side edge of said blade and each being located above said front cutting edge so that said laterally extending portions remain above the ground when said knife is in normal use, d. and a pair of mounting arms one integrally connected to the outer edge of each said laterally extending portion, each arm having an inner surface spaced laterally outwardly of a respective side edge of said blade, said inner surfaces thereby being clear of sod travelling over said support and guide means, each arms being adapted to be connected to carrying means for carrying and reciprocating said knife.

Further objects and advantages of the invention will appear from the following description, taken together with the accompanying drawings, in which.

Figure 1:
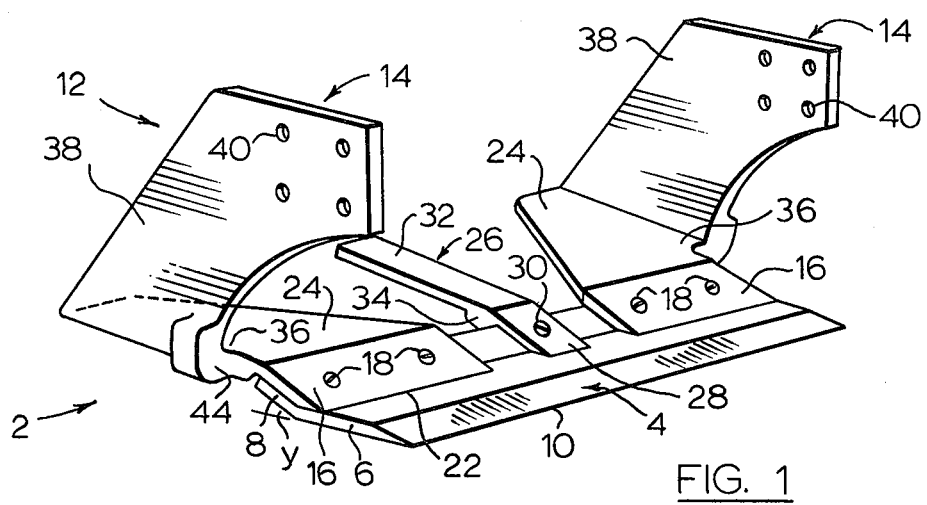
FIG. 1 is a perspective view of a sod undercutting knife according to the invention.
Figure 2:
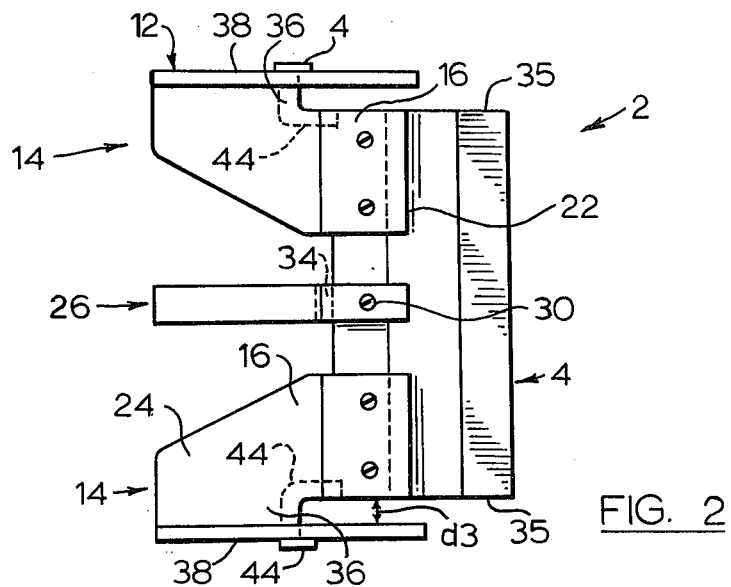
FIG. 2 is a top view of the knife of FIG. 1.
Figure 3:
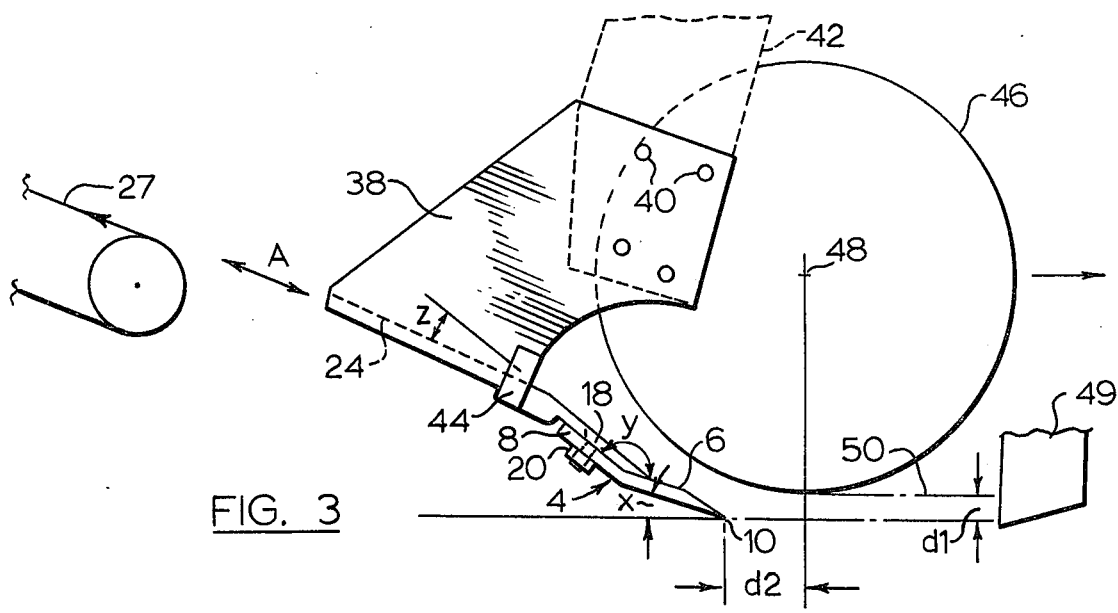
FIG. 3 is a side view of the knife of FIG. 1, showing the knife in cutting position behind the roller of a sod harvester.

Reference is first made to FIGS. 1 to 3, which show a sod undercutting knife 2 according to the invention. The undercutting knife 2 includes an undercutting blade 4 having a front cutting portion 6 and a rear support portion 8. The support portion 8 is bent upwardly at an angle from the front cutting portion 6. The front edge of the cutting portion 6 is sharpened, as indicated at 10.

The undercutting blade 4 is mounted on combined support and guide means generally indicated at 12. The support and guide means 12 consists of two side members 14, one at each side of the blade 4. Each side member 14 includes a front portion 16 which overlies the rear portion 8 of the blade, and is bolted thereto by countersunk bolts 18 and nuts 20. The heads of the bolts 18 are flush with the upper surfaces of the side member front portions 16, to minimize interference with sod passing thereover. The lower surface of the front edge of each front portion 16 is bevelled to match the bend in the blade 4, thus forming a sharp front edge 22 for the front portion 16 of each side member. The front edges 22 lie snugly against the upper surface of the blade 4, thus minimizing resistance to passage of sod thereover and holding the blade 4 tight in position.

Each side member 14 further includes a rear portion 24 which slopes slightly downwardly relative to the front portion 16 thereof. The rear portions 24, together with a guide strip 26 located between the side members 14, serve to guide cut sod from the blade 4 to a conveyor (diagrammatically indicated at 27 in FIG. 3) located behind the undercutting knife 2. The use of guide strips to guide cut sod from an undercutting knife to a conveyor is conventional and is shown in the said Brouwer U.S. patent. Guide strip 26 has a front portion 28, bolted to the blade by a bolt 30, and a slightly downwardly angled rear portion 32. A weldment 34 on the lower surface of the rear portion 32 abuts against the rear edge 34 of the blade 4 and prevents rotation of the guide strip 26.

As best shown in FIG. 2, the rear portions 24 of the members 14 extend laterally of the side edges 35 of the undercutting blade 4. Connected to the laterally projecting portions 36 of the rear portions 24 are two mounting arms 38, one for each side member 14. The mounting arms 38 extend forwardly and upwardly, typically to a position about midway between the front and the rear of the undercutting blade 4. At their forward ends, the mounting arms 38 contain holes 40 through which bolts may be inserted to secure the mounting arms to carrying members (indicated in dotted lines at 42 in FIG. 3) which are used to carry and to reciprocate the cutting knife 2. The carrying members 42, which reciprocate the knife 2 in the direction indicated by arrow A, are conventional and are shown in the said Brouwer U.S. patent.

To strengthen the joins between the mounting arms 38 and the remainder of the side members 14, thickened areas 44 (formed by weldments) are provided where the arms 38 join the rear portions 24 of the support members 14. The thickened areas 44 extend along the lower surface of the edges of the rear portions 24 from a location behind the blade 4, and then along the bottoms of the leading edges of the laterally extending portions 36, and then up the outsides of the leading edges of the arms 38 for a short distance. This reduces the likelihood of cracks forming at the leading edge of the join between the mounting arms 38 and the remainder of the support members 14.

FIG. 3 shows a roller 46 of a typical sod cutting machine (such as that shown in the said Brouwer U.S. patent). The axis of the roller 46 is indicated at 48, and the surface of the sod to be cut and over which the roller rolls is indicated at 50. Located ahead of the roller 46 are side cutting knives, one of which is diagrammatically indicated at 49, and which cut the edges of the sod strip before the strip has been undercut (thus reducing the likelihood of tearing the edges of the sod strip). The side cutting knives 49 may be reciprocated, by means not shown, and they may be reciprocated oppositely to the reciprocation of the undercutting knife 2 (as shown in my copending application entitled "Oppositely Reciprocating Side and Undercutting Knives for a Sod Cutting Machine", Ser. No. 554,812, filed concurrently herewith).

It will be seen that the front edge 10 of the undercutting blade 4 is located at distance $d1$ below the surface of the sod to be cut, producing cut sod of thickness $d1$. The front edge of the undercutting blade 4 is also located at a distance $d2$ behind the axis 48 of the roller. The distance $d2$ should be as short as possible, in order to produce cut sod of uniform thickness.

For applications in which the cut sod is to be conveyed upwardly to a conveyor, the blade 4 will normally be inclined at an angle X (FIG. 3) to the horizontal. Angle X is usually sufficient that the nuts 20 clear the ground at all times during reciprocation of the blade 4. However, angle X will normally be kept quite small (typically about 10°), to obtain a flat cut. If angle X were too steep, distance $d2$ would have to be increased or else sod would tend to jam between the blade 4 and the roller 36.

The angle Y between the front and rear parts 6, 8 of the blade 4 increases the ground clearance for the nuts 20 and also is made steep enough so that the sharp bevelled edge 22 of the support members 14 (and the corresponding edge of the guide strip 26) need not be made too long. However, angle Y should not be made too steep or it may interfere with passage of sod thereover. Preferably angle Y is about 150°. The angle of the bevel in the lower surface of the front portions 16 of the side members is of course made the same as angle Y.

The angle between the rear portions 24 and the front portions 16 of the side members 14 is indicated at Z in FIG. 3. The downslope represented by angle Z reduces the total height to which the knife 2 elevates the sod, ensuring that the sod will not turn back on itself, while at the same time permitting a steeper angle Y, to ensure that the nuts 20 are clear of the ground. Angle Z is preferably about 20° but may range between from 0° (as shown in the FIGS. 4 and 5 embodiment) to about 30°, so long as arms 38 remain clear of the ground and grass as will now be described.

It will be seen that the bottom edges of the mounting arms 38 are located behind and above the rear of the front portion 6 of the blade 4. This ensures that they are well clear of the ground as the knife is reciprocated, so that they do not offer any interference to the cutting action.

It will also be seen that the arms 38 are spaced sideways of the side edges 35 of the undercutting blade 4. Since the width of the sod strip being cut is the same as the width of the undercutting blade 4, this sideways spacing of the arms 38 ensures that the edges of the sod strip will not rub against the arms 38 as the strip travels over the cutting knife. Since the undercut strip of sod is often very thin (the thickness of the earth and root mass may be only ¼ inch) and hence is extremely fragile, the absence of surfaces which would tend to catch the edges of the undercut sod strip assists substantially in protecting the integrity of the strip. The lateral spacing of the arms 22 from the side edges 35 of the undercutting blade 4 is indicated at $d3$ in FIG. 2 and will normally be between 1/16 and ¾ inch.

Figure 4:
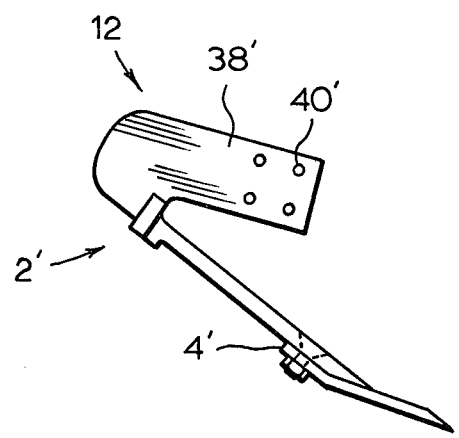
FIG. 4 is a side view of a modification of the knife of FIGS. 1 to 3.
Figure 5:
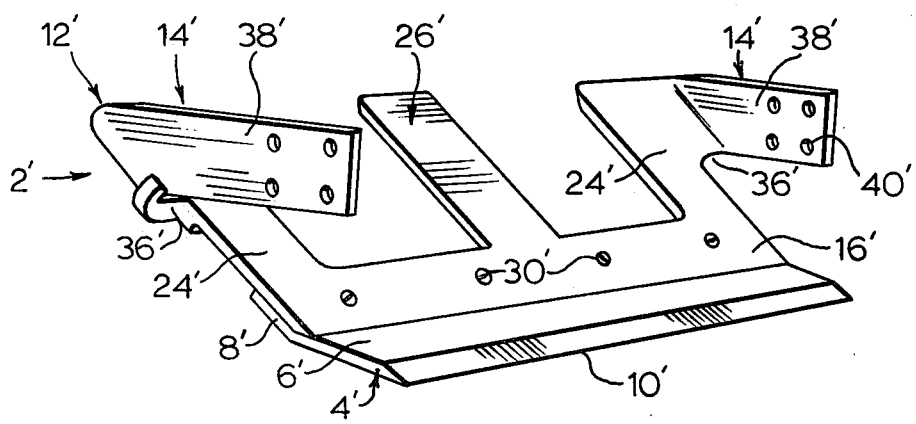
FIG. 5 is a perspective view of the knife of FIG. 4.

Reference is next made to FIGS. 4 and 5 which show a cutting knife 2' similar to that of FIGS. 1 to 3 and in which primed reference numerals indicate parts corresponding to those of FIGS. 1 to 3. The FIGS. 4 and 5 embodiment differs from that of FIGS. 1 to 3 in that the support means 12' for the blade 4', and the guide strip 26', have together been formed as a single integral unit. The front portion 16' of the unit 12' extends across the full width of the rear part of the undercutting blade 4', and has, as before, a bevel which matches the bend in the blade 4', to minimize interference with passage of sod thereover.

As before, the mounting arms 38' are connected to the rear part of the support members 14' by laterally extending portions 38, so that the edges of the cut sod will not rub against the mounting arms 38'.

It will be seen that the blade 4 is inexpensive to replace, since it is a simple strip of hardened metal having only a single bend and a few holes therein, and with no welds or other fabrication required. The support and guide means 12 will last for a substantial period of time, and should the guide strip 26 break, it can (in the FIGS. 1 to 3 embodiment) be replaced separately.

If desired, the bend in blade 4 may be eliminated (in which case the blade 4 will simply be a flat piece of metal). In other words, angle Y will be increased to 180°. The ground clearance for nuts 20 is then obtained simply from the angle of the blade or recessed cap screws may be used). However, the bend in the blade is much preferred, partly because it ensures better ground clearance for the nuts and bolts, and partly because it strengthens the blade 4 against bowing as viewed from the front (which bowing would cause the cut sod to be of non-uniform thickness from one side to the other).

What I claim is:
1. An undercutting knife for a sod cutting machine, said knife comprising:
 a. an undercutting blade having a front cutting edge, and a rear portion,
 b. combined support and guide means for said undercutting blade, said support and guide means having a front portion and a rear portion, and means detachably connecting said front portion of said support and guide means to said rear portion of said blade for smooth passage of sod from said blade over said support and guide means, c. said rear portion of said support and guide means having two laterally extending portions, one at each side thereof, each laterally extending portion extending laterally beyond a side edge of said blade and each being located above said front cutting edge so that said laterally extending portions remain above the ground when said knife is in normal use, d. and a pair of mounting arms one integrally connected to the outer edge of each said laterally extending portion, each arm having an inner surface spaced laterally outwardly of a respective side edge of said blade, said inner surfaces thereby being clear of sod travelling over said support and guide means, each arm being adapted to be connected to carrying means for carrying and reciprocating said knife, e. said blade having a transverse bend therein extending across its width, and dividing said blade into a front portion and said rear portion, said cutting edge being formed on said front portion and said rear portion slanting upwardly from said rear portion, f. said front portion of said support and guide means having a bevel in its lower surface at the front edge thereof, the angle between said bevel and the remainder of the lower surface of said front portion of said support and guide means being the same as the angle between said front and rear portions of said blade, said bevel lying over the upper surface of said front portion of said blade immediately in front of said bend, whereby to reduce interference to movement of sod passing from said blade over said support and guide means.

2. The invention according to claim 1 wherein said support and guide means includes three discrete members, namely a pair of side members and a guide strip, one of said laterally extending portions being integrally connected to each of said side members, said guide strip being an elongated strip located between said side members and extending rearwardly from said blade.

3. The invention according to claim 1 wherein said angles are each substantially 150°.

4. The invention according to claim 1 wherein said angles are each substantially 150° and wherein that part of said rear portion of said support and guide means located behind said blade slopes downwardly relative to the remainder of said rear portion of said support and guide means at an angle of between 0° and 20°.

5. The invention according to claim 1 wherein said means for connecting includes bolts having heads, and nuts, said heads being countersunk in said front portion of said support and guide means and having their upper surfaces flush with the upper surface of said front portion of said support and guide means, said nuts abutting against the lower surface of said rear portion of said blade and being spaced rearwardly of said bend.

6. An undercutting knife for a sod cutting machine, said knife comprising:

a. an undercutting blade have a front cutting edge, and a rear portion, b. combined support and guide means for said undercutting blade, said support and guide means having a front portion and a rear portion, and means detachably connecting said front portion of said support and guide means to said rear portion of said blade for smooth passage of sod from said blade over said support and guide means, c. said rear portion of said support and guide means having two outer edge portions, one at each side thereof, each edge portion being located above said front cutting edge so that said edge portions remain above the ground when said knife is in normal use, d. a pair of mounting arms one integrally connected to each outer edge portion, each arm being adapted to be connected to carrying means for carrying and reciprocating said knife, e. said blade having a transverse bend therein extending across its width, and dividing said blade into a front portion and said rear portion, said cutting edge being formed on said front portion and said rear portion slanting upwardly from said rear portion, f. said front portion of said support and guide means having a bevel in its lower surface at the front edge thereof, the angle between said bevel and the remainder of the lower surface of said front portion of said support and guide means being the same as the angle between said front and rear portions of said blade, said bevel lying over the upper surface of said front portion of said blade immediately in front of said bend, whereby to reduce interference to movement of sod passing from said blade over said support and guide means.

* * * * *